United States Patent [19]

Holtzberg et al.

[11] 4,440,069

[45] Apr. 3, 1984

[54] COMPOSITE PISTON AND PROCESS

[75] Inventors: Matthew W. Holtzberg, Ringwood, N.J.; Steven J. Henke, Woodridge, Ill.; Lawrence D. Spaulding, Naperville, Ill.; James C. Oakley, Montgomery, Ill.

[73] Assignee: Standard Oil Corporation (Indiana), Chicago, Ill.

[21] Appl. No.: 387,323

[22] Filed: Jun. 11, 1982

[51] Int. Cl.³ .................................................. F16J 1/01
[52] U.S. Cl. ................................. 92/224; 123/193 P; 29/156.5 R
[58] Field of Search .............. 123/198 P; 92/222, 224; 29/156.5 R

[56] References Cited

U.S. PATENT DOCUMENTS

| | | | |
|---|---|---|---|
| 3,748,304 | 7/1973 | Stephens | 528/210 |
| 4,016,140 | 4/1977 | Morello | 264/331.19 |
| 4,017,459 | 4/1977 | Onder | 260/47 CP |
| 4,098,775 | 7/1978 | Onder | 528/35 C |
| 4,224,214 | 9/1980 | Chen | 264/325 |
| 4,306,489 | 12/1981 | Driver et al. | 123/193 P |

FOREIGN PATENT DOCUMENTS 2484042 12/1961 France .

OTHER PUBLICATIONS

Wise; Charles "Plastic Engine is Off and Running" *Machine Design*, vol. 52, No. 10, (May 8, 1980) pp. 24–26.

*Primary Examiner*—William A. Cuchlinski, Jr.
*Attorney, Agent, or Firm*—Thomas W. Tolpin; William T. McClain; William H. Magidson

[57] ABSTRACT

A lightweight composite piston is provided to decrease fuel consumption, attenuate noise, and permit increased speed of operation.

40 Claims, 6 Drawing Figures

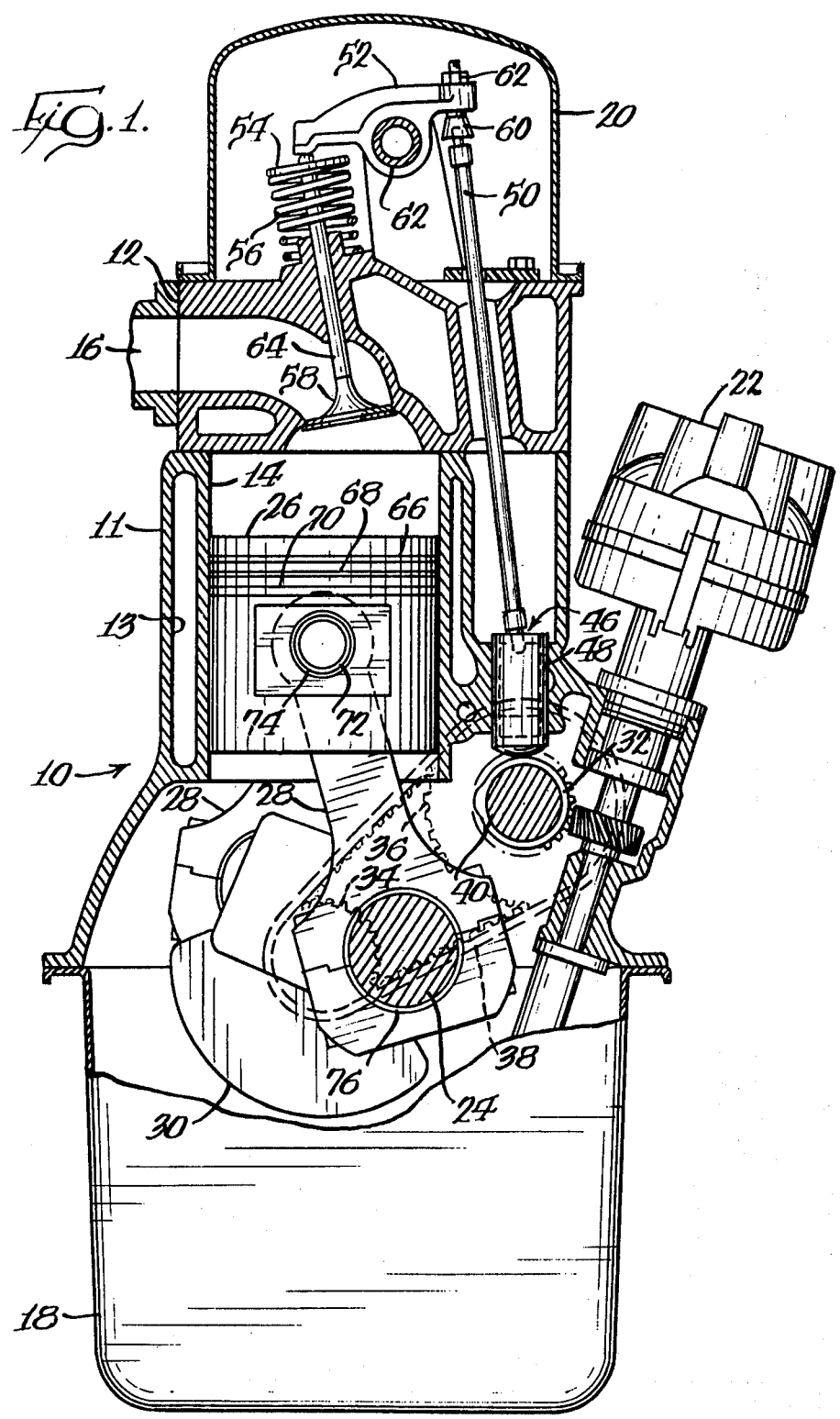

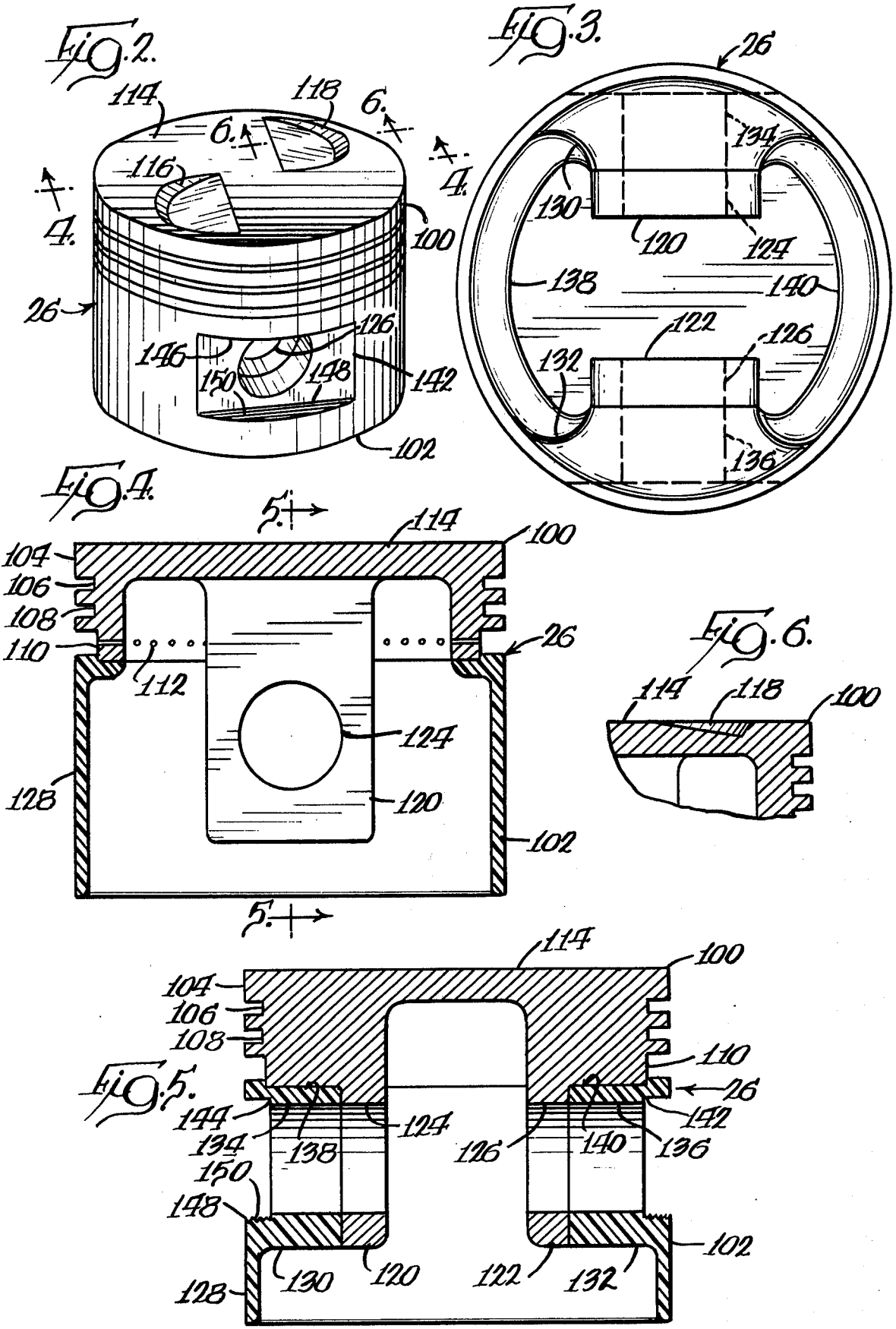

COMPOSITE PISTON AND PROCESS

BACKGROUND OF THE INVENTION

This invention relates to engines, and more particularly, to engine parts and a process for making the same.

Traditionally, engines have been made of metal, usually steel or cast iron. Steel and cast iron engines are useful, except they are quite heavy and consume considerable amounts of gasoline or diesel fuel. Conventional engines exert large compressive forces, considerable torque, and substantial secondary harmonic vibrations which have to be dampened by counterbalancing pistons, flywheels, dampeners, etc. The moving metal parts of cast iron and steel engines generate high centrifugal, reciprocating, and inertial forces, momentum, and loads. Generally, the weight of the engine adversely affects its performance, efficiency, and power.

Recently, it has been suggested to use plastic engine parts in automotive engines. Such suggestions have appeared in the December 1980 issue of *Automotive Industries* at pages 40–43, in an article entitled, "What . . . a Plastic Engine!?"; in the May 8, 1980 issue of *Machine Design*, Volume 52, No. 10, in an article entitled, "Plastic Engine Is Off And Running," and in French Application No. 2,484,042, published Dec. 11, 1981.

An experimental prototype engine with concealed plastic engine parts was displayed at the Society of Automotive Engineers' (SAE) Show in Detroit, Mich. in February 1980.

Over the years, amide-imide polymers have been developed for use in molding and producing various products, such as wire coatings, enamels, films, impregnating materials, and cooking utensils. Typifying these prior art amide-imide products, polymers and molding processes are those described in U.S. Pat. Nos. 3,546,152; 3,573,260; 3,582,248; 3,660,193; 3,748,304; 3,753,998; 4,016,140; 4,084,144; 4,136,085; 4,186,236; 4,167,620; and 4,224,214. These prior art products, polymers, and molding processes have met with varying degrees of success.

It is, therefore, desirable to provide a lightweight engine part.

SUMMARY OF THE INVENTION

An improved lightweight composite engine part is provided for use in gasoline and diesel powered automotive engines, truck engines, aircraft engines, marine engines, single and two cylinder engines, such as lawn mower engines, portable generators, and other internal combustion engines. The lightweight composite engine part decreases gasoline and fuel consumption, attentuates noise for quieter performance, and permits increased speed of operation. The lightweight composite engine part produces higher horsepower for its weight than conventional engine parts, while maintaining its shape, dimensional stability, and structural integrity at engine operating conditions. The lightweight composite engine part decreases centrifugal, reciprocating, and inertial forces, momentum, and load on the engine.

The composite engine part has a greater stiffness-to-weight ratio than metal, is flame resistant, and is stable to heat. The composite engine part is capable of effectively functioning at engine operating temperatures and start-up conditions during hot and cold weather. The composite engine part has high mechanical strength, thermal stability, fatigue strength, and excellent tensile, compressive, and flexural strength. The composite engine part is resistant to wear, corrosion, impact, rupture, and creep, and reliably operates in the presence of engine fuels, oils, and exhaust gases.

In contrast to metals, such as cast iron, steel, aluminum, titanium, and to thermosetting resins, such as epoxy resin, the composite engine part can be injection molded. Injection molding permits closer tolerances with less secondary machining operations for production efficiency and economy. Finished surfaces of injected molded composite engine parts are of better quality and have fewer knit lines, seams, and flashes than do engine parts made from cold metal forging, casting, fabrication, or other conventional techniques. If desired, some of the composite engine parts can be insert molded or compression molded.

The lightweight composite engine part is made of durable, impact-resistant, hybrid or composite material which includes special proportions of an amide-imide resinous polymer, preferably reinforced with graphite and/or glass fibers. The amide-imide resinous polymer can also be blended with polytetrafluoroethylene (PTFE) and/or titanium dioxide. Composite engine parts which are injection molded or otherwise made from amide-imide resinous polymers have better elongation, stiffness, moduli, and strength at engine operating conditions than do other plastics, such as epoxy resin, polyimides, aramids, polyphenylene sulfide, polytetrafluoroethylene, and nylon. A particularly suitable amide-imide resinous polymer is commercially available from Amoco Chemicals Corporation under the trademark and product designation TORLON.

In the invention of this application, the composite engine parts take the form of a hybrid, composite piston. The hybrid composite piston has a metal head and a thermoplastic, amide-imide resinous polymeric skirt connected to the head. Desirably, the hybrid composite piston exerts less shock on the cylinder walls then does conventional pistons.

The metal head has an annular wall defining a set of piston ring-receiving grooves and a transverse disc extending across the annular wall to compress the air-fuel mixture in the cylinder (combustion chamber). A pair of legs extend longitudinally from the disc. The legs are spaced radially inwardly of the annular wall and define a pair of diametrically opposed leg holes.

The thermoplastic skirt has an elongated annular wall portion and a pair of bosses which extend radially inwardly from the wall portion. The wall portion is positioned in a generally longitudinal alignment and cooperates with the annular wall of the head to define a composite piston wall which reciprocatingly slides against the cylinder wall. The wall portion of the skirt annularly surrounds the legs of the metal head. The bosses of the skirt are connected to the legs of the head and define a pair of diametrically opposed skirt holes. The skirt holes and the leg holes are transversely aligned in registration with each other and are of a sufficient size to pivotally receive a wrist pin. In the preferred form, the maximum transverse span of the legs is slightly greater than the minimum distance between the bosses of the skirt and the metal head's legs, and skirt's bosses are in press-fitting engagement with each other.

The thermoplastic amide-imide resinous polymeric skirt is preferably injection molded, allowed to cool below its plastic deformation temperature to solidify its shape, and then is post cured by solid state polymerization to increase its strength. The metal head is preferably turned on a lathe to form an annular wall with a set of piston ring-receiving grooves and a substantially circular disc which extends across the annular wall. The legs extending axially from the disc are cut on a milling machine and drilled to define a pair of aligned leg holes.

The thermoplastic skirt is connected to the metal head by press-fitting the bosses of the skirt against the legs of the head until the skirt abuts against the head's annular wall and the skirt holes in the bosses are aligned in registration with the leg holes. The aligned holes in the skirt and legs are then honed to a sufficient size to pivotally receive the wrist pin.

A more detailed explanation of the invention is provided in the following description and appended claims taken in conjunction with the accompanying drawings.

BRIEF DESCRIPTION OF THE DRAWINGS

FIG. 1 is a cross-sectional view of an automotive engine with a composite piston in accordance with principles of the present invention;

FIG. 2 is a perspective view of the composite piston;

FIG. 3 is a bottom view of the composite piston;

FIG. 4 is a cross-sectional view of the composite piston taken substantially along line 4—4 of FIG. 2;

FIG. 5 is a cross-sectional view taken substantially along line 5—5 of FIG. 4; and FIG. 6 is a fragmentary cross-sectional view of the composite piston taken substantially along line 6—6 of FIG. 2.

DETAILED DESCRIPTION OF THE PREFERRED EMBODIMENT

The automotive engine 10 of FIG. 1 has lightweight composite engine parts to reduce its weight, decrease fuel consumption, and improve engine performance. Engine 10 is a gasoline powered, four stroke, spark ignition engine. The illustrated engine is a V-6 engine with 6 cylinders arranged in a V-shaped firing pattern.

While the composite engine parts are described hereinafter with particular reference to the illustrated engine, it will be apparent that the engine parts can also be used in other types of gasoline powered automotive engines, as well as in diesel powered automotive engines, truck engines, aircraft engines, marine engines, locomotive engines, lawn mower engines, portable generators, and other internal combustion engines. The composite engine parts can be used in 1, 2, 4, 6, 8 or more cylinder engines including V-arranged cylinder engines, aligned cylinder engines, horizontally opposed cylinder engines, rotary engines, etc.

As shown in FIG. 1, engine 10 has a cast iron block 11 and head 12. The block has many chambers including a cooling chamber 13 and six combustion chambers 14 which provide cylinders. The head has an exhaust manifold and an intake manifold 16 which communicate with the cylinders and an overhead carburetor (not shown). Extending below the block is an oil pan 18. Extending above the head is a rocker arm cover 20. A distributor 22 with an internal set of spark plugs (not shown) is provided to ignite the gaseous air mixture in the cylinders.

A metal crankshaft 24 drives the pistons 26 through connecting rods 28. A counterweight 30 on crankshaft 24 balances the pistons. The crankshaft 24 drives a metal camshaft 32 through a set of timing gears 34 and 36. The timing gears include a crankshaft gear or drive pulley 34 mounted on the crankshaft 24, and a camshaft gear or driven pulley 36 mounted on the camshaft 32. A fabric reinforced, rubber timing belt 38 or timing chain drivingly connects the crankshaft gear 34 and the camshaft gear 36. The camshaft gear 36 has twice the diameter and twice as many teeth as the crankshaft gear 34, so that the camshaft 18 moves at one-half the speed of the crankshaft. In some types of engines, the crankshaft gear drives the camshaft gear directly without a timing belt or timing chain.

Metal cams 40 are mounted on the camshaft 32 to reciprocatingly drive the valve trains 46. There are two or four valve trains per cylinder depending on the type of engine. Each valve train has a valve lifter 48, a push rod 50, a rocker arm 52, a valve spring retainer 54, a compression spring 56, and a valve 58 which opens and closes the exhaust manifold or the intake manifold 16. The intake valve 58 opens and closes the intake manifold 16. The exhaust valve opens and closes the exhaust manifold. The lifter 48 rides upon and follows the cam 40. The push rod 50 is seated in a recess of the lifter and is connected to the rocker arm 52 by a threaded stud 60 and nut 62. The bottom end of the stud 60 is shaped complementary to the top end of the push rod to securely receive and engage the push rod. The rocker arm 52 pivots upon a rocker arm shaft, fulcrum or pin 62 and reciprocatingly drives the valve stem 64 of the valve 58.

The piston 26 reciprocatingly slides against a metal liner that provides the cylinder walls. A set of piston rings is press fit or snap fit on the head of the piston. The piston rings include a compression ring 66, a barrier ring 68, and an oil scraper ring 70. The piston is pivotally connected to the connecting rod 28 through a wrist pin 72 and a bushing 74. The connecting rod is pivotally connected to the crankshaft 24 through a split ring metal bearing 76.

In a four stroke internal combustion engine, such as the illustrated engine, each piston has an intake stroke, a compression stroke, a power stroke, and an exhaust stroke. During the intake stroke, the piston moves downward and the inlet valve is opened to permit a gaseous air mixture to fill the combustion chamber. During the compression stroke, the intake and exhaust valves are closed and the piston moves upward to compress the gaseous air mixture. During the power stroke, the spark plug is ignited to combust the gaseous air mixture in the combustion chamber and the rapidly expanding combustion gases drive the piston downward. During the exhaust stroke, the exhaust valve is opened and the piston moves upward to discharge the combustion gases (exhaust gases).

The pistons, as well as connecting rods, wrist pins, barrier piston rings, push rods, rocker arms, valve spring retainers, intake valves, and timing gears, can be made of metal, although it is preferred that they are at least partially made of a thermoplastic, amide-imide resinous polymer to reduce the weight of the engine. Such amide-imide engine parts are referred to as composite engine parts. In some engines, the exhaust valve can also be at least partially made of a thermoplastic, amide-imide resinous polymer.

As shown in FIGS. 2–5, the hybrid composite piston 26 has a metal head or crown 100 and a thermoplastic, amide-imide resinous polymeric elongated annular skirt 102. The hybrid composite piston 26 is approximately 25% to 50% lighter than conventional metal pistons. Advantageously, the thermoplastic skirt and the metal head maintain their structural shape, relationship, and integrity at engine operating conditions. The coefficient and rate of thermal expansion and contraction of the amide-imide polymeric skirt are similar to those of the metal head, so that the thermoplastic skirt expands and contracts compatibly with the metal head at engine operating conditions.

The metal head 100 has sufficient thermal strength to compress the air-fuel mixture in the combustion chamber and to effectively operate and withstand the pressures and temperatures exerted during ignition and combustion. The head can be made of aluminum, steel or ceramic. The head has an annular wall 104 with a set of piston ring-receiving grooves 106, 108 and 110. The grooves include a compression ring-receiving groove 106, a barrier ring-receiving groove 108, and an oil scraper ring-receiving groove 110. The annular wall 104 also has a set of circumferentially spaced oil apertures or holes 112 for passage of oil.

The head 100 has a transverse metal disc 114 which integrally extends across, between, and connects the top of the annular wall 104. The disc 114 has a generally planar or flat face to compress the airfuel mixture in the cylinder (combustion chamber) and can have an optional pair of semi-circular recesses 116 and 118 which provide valve pockets or seats. The disc is preferably full round and circular to avoid cold metal forging or stamping and expensive cam grinding as is done in conventional oval (elliptical shaped) pistons. While full round circular heads are preferred for the above reasons, the head can be oval or elliptical, if desired.

The head 100 also has a pair of rigid elongated metal legs or stringers 120 and 122 which extend longitudinally and integrally downwardly from the disc 114. The legs help absorb the bearing load exerted by the wrist pin on the piston. The legs are spaced radially inwardly from the annular wall of the head and skirt and define a pair of diametrically opposed leg holes 124 and 126 (FIG. 5).

The thermoplastic skirt 102 has an elongated annular wall portion 128 which is positioned in general longitudinal alignment with and cooperates with the annular wall 104 of the head to provide a generally flush, composite piston wall which reciprocatingly slides against the cylinder wall. The skirt's wall portion 128 is substantially longer than the head's skirt 104 and annularly surrounds the legs 120 and 122 of the head.

The thermoplastic skirt 102 has a pair of diametrically opposed bosses 130 and 132 which extend radially and integrally inwardly from the annular wall 128. The bosses are connected to the legs, preferably by press fitting for best performance, although in some circumstances the bosses and legs can be connected together by other means, such as by fasteners or adhesive bonding. In order to press fit the legs in the bosses, the minimum distance or span between the bosses is slightly less than the maximum transverse span of the legs.

As best shown in FIG. 5, the bosses 130 and 132 have a pair of diametrically opposed skirt holes or boss holes 134 and 136 which are aligned in registration with, and have substantially the same diameter as, the leg holes 124 and 126. The skirt holes and leg holes cooperate with each other to pivotally receive the wrist pin. The skirt also has a pair of generally C-shaped flanges or ears 138 and 140 which extend radially inwardly of the annular wall portion 128 and arcuately connect the bosses 130 and 132. The skirt holes are surrounded by generally planar, or flat, transverse, rectangular recesses 142 and 144 (FIGS. 2 and 5) along the outside surface of the annular wall portion 128. Each rectangular recess has longitudinally spaced shoulders which provide upper and lower horizontal ledges 146 and 148 (FIG. 2). In the illustrative embodiment at least one, and preferably both of the ledges have horizontally extending, transversely spaced, oil retention grooves 150. The skirt wall defining the skirt bosses can also have retaining ring-receiving grooves if it is desired to connect the wrist pin to the skirt hole wall with a retaining ring, snap ring, or C-washer. The thermoplastic skirt helps dampen noise and exerts less shock on the cylinder walls.

The thermoplastic skirt is preferably injection molded for closer tolerances, minimal secondary machining operations and enhanced structural strength. The skirt can also be insert molded into a hollow metal head. The injection molding temperature (polymer melt temperature) of the polymer is preferably from 630° F. to 670° F., which is above the plastic deformation temperature of the amide-imide polymer. The molded skirt should be allowed to cool below its plastic deformation temperature to solidify its shape and polymeric orientation. The total molding and cooling time ranges from 15 to 30 seconds, depending on the grade of the polymeric resin and desired cross-sectional thickness of the molded skirt.

In the preferred injection molding process, which is sometimes referred to as coining, the mold is partially opened (partially closed) to expose its generally skirt-shaped cavity. A dam is placed adjacent the partially opened portion of the mold to prevent the polymer from falling out of the open portion of the mold onto the parting line. The amide-imide polymer is injected at its melt temperature into the cavity until the cavity is substantially filled with the polymer. The amount of polymer injected can be metered out by an injection ram and detected by a limit switch. As soon as the cavity is filled with the polymer the mold is clamped closed to compress the polymer. The compressed polymer is cooled in the clamped closed mold until it reaches a temperature below its plastic deformation temperature to solidify the shape of the molded skirt. Advantageously, the coining injection molding process minimizes voids in the molded thermoplastic bosses of the skirt for increased strength.

The cooled molded engine part providing the blank is then post cured by solid state polymerization by progressively heating the molded engine part below its melting temperature to enhance its dimensional strength and integrity. The specific time and temperatures depend upon the desired size of the molded part.

In the preferred method of post curing, the molded engine part is preheated in the presence of a circulating gas in an oven for a period of time such that a major portion of the volatiles contained in the injection molded engine part are vaporized and removed, while simultaneously increasing the deflection temperature of the polymer from about 15° F. to 35° F. without deformation of the engine part. Preheating can be carried out by heating the molded part from an initial temperature to a final temperature with either continuous or stepwise increases in temperature over a period of time, or at a single temperature, for a sufficient time to vaporize and remove the volatiles and increase the polymer's deflection temperature.

Imidization, cross-linking and chain extension take place during preheating. Continuous or stepwise preheating increases tensile strength and elongation properties of the molded engine parts.

In order to enhance the physical properties of smaller molded engine parts, it is preferred to continuously preheat the molded part from an initial temperature of 300° F. to 330° F. to a final preheating temperature of 460° F. to 480° F. for about 40 to 60 hours. Alternatively, the molded engine part can be preheated in a stepwise manner from an initial preheating temperature of 300° F. to 330° F. for 20 to 30 hours to a final preheating temperature of 410° F. to 430° F. for 20 to 30 hours.

Generally, the molded part is heated (post cured) at a temperature of about 330° F. for 24 hours, about 475° F. for 24 hours, and about 500° F. for 24 hours. More specifically, the molded article is heated in the presence of a circulating gas at about 5° F. to 25° F., and preferably about 5° F. to 15° F., below the increased deflection temperature of the polymer for a period of time such that substantial imidization, chain extension and cross-linking take place without deformation of the molded article.

As a result of such heating, water and gases continue to be generated and removed, and the molecular weight and deflection temperature of the polymer are increased. Heating is continued for a period of time sufficient to increase the deflection temperature by about 15° F. to 35° F. Preferably, the heating is at a temperature ranging from about 450° F. to 490° F. for a period of at least 20 hours. Thereafter, the temperature is increased to about 5° F. to 25° F. below the polymer's new deflection temperature and held at the new temperature for a sufficient time to increase the polymer's deflection temperature by about 15° F. to 35° F. Preferably, such heating is at about 480° F. to 520° F. for a period of at least 20 hours.

Heating is continued in this manner to increase the polymer's deflection temperature to its maximum attainable value without deformation of the molded article. The final heating stage is carried out at about 5° F. to 25° F., and preferably from about 5° F. to 15° F., below the maximum attainable temperature for at least 20 hours, and most preferably at least 40 hours. The heated part is then cooled.

In order to best enhance the physical properties of the molded engine part, it is preferred to heat the molded part from about 460° F. to about 480° F. for about 20 to 30 hours, then from about 490° F. to 510° F. for about 20 to 30 hours, and subsequently from about 495° F. to about 525° F. for about 20 to 60 hours.

Post curing should be carried out in the presence of a circulating gas which flows through and around the molded engine part to remove water and gases from the polymeric resin. The amount of circulation and the circulation flow pattern should be coordinated to maximize removal of water and the gases without causing substantial variations in temperature. While inert gases, such as nitrogen, can be used, it is preferred that the circulating gas be an oxygen-containing gas, most preferably air, because oxygen tends to facilitate cross-linking of the polymer molecules. Post curing is preferably carried out in a circulating air oven, although it can be carried out in any other suitable apparatus.

Post cured engine parts are resistant to thermal shock at temperatures of at least 500° F. and exhibit significantly improved tensile strength and elongation as compared with untreated molded, amide-imide resinous engine parts. A more detailed explanation of heat treatment by post curing is described in Chen U.S. Pat. No. 4,167,620, which is hereby incorporated by reference.

After the molded engine part (thermoplastic skirt) is post cured, the skirt holes are drilled in the bosses, if they are not already molded, and the skirt is optionally ground. The skirt preferably has a circular cross-sectional thickness.

The metal head is turned or spun on a lathe to form the annular skirt 104, piston ring grooves 106, 108 and 110, and circular transverse disc 114. The valve seats 116 and 118 can be cut into the face of the disc. The legs providing the rigid metal stringers are cut on a milling machine or a lathe to the desired size. The oil apertures 112 are drilled in the head and the leg holes are drilled in the legs. The head is ground and polished, as desired.

After the skirt has been molded and the head formed, the skirt and head are press fit into each other so that the head's legs press fit against the skirt's bosses and the upper horizontal surfaces of the ears 138 and 140 abut against the downwardly facing annular surface of the head's skirt. The skirt holes and leg holes are aligned and honed.

While the machining operations described above are preferably conducted after the injection molded engine part is post cured, one or more of these machining operations can be conducted before post curing if desired.

The composite engine part and the thermoplastic, amide-imide resinous polymer contained therein substantially maintain their shape, dimensional stability and structural integrity at engine operating conditions. Usual engine operating temperatures do not exceed 350° F. Oil cooled engine operating temperatures range from about 200° F. to 250° F. Advantageously, the composite thermoplastic, amide-imide resinous, polymeric engine part is impervious and chemically resistant to oil, gasoline, diesel fuel, and engine exhaust gases at engine operating conditions.

The thermoplastic resin in the composite engine part comprises 40% to 100%, preferably 65% to 75%, by weight amide-imide resinous polymer. The polymer is preferably reinforced with graphite fibers and/or glass fibers. In molded parts the fibers have an average length of 6 to 10 mils and a preferred diameter of about 0.2 to 0.4 mils. The ratio of the length to diameter of the fibers is from 2 to 70, averaging about 20. While the above fiber lengths and diameters are preferred for best structural strength, other lengths and diameters can be used, if desired. The graphite fibers can be granulated or chopped and can be optionally sized or coated with a polysulfone sizing or some other polymer which will maintain its structural integrity at engine operating conditions. The glass fibers can be milled or chopped and can be sized with silane or some other polymer that maintains its structural integrity at engine operating conditions. Chopped graphite and glass fibers are preferably sized, while granulated graphite fibers are preferably unsized.

Desirably, the thermoplastic, amide-imide resinous polymer comprises 10% to 50%, preferably 30% to 34%, by weight graphite fibers or 10% to 60%, preferably 30% to 34%, by weight glass fibers. The polymer can have as much as 3% and preferably ½% to 1% by weight powdered or granular polytetrafluoroethylene (PTFE) and/or as much as 6% by weight titanium dioxide. In some circumstances it may be desirable to add more PTFE.

The polymer's molding characteristics and molecular weight can be controlled to facilitate polymerization with an additional monomer, such as trimellitic acid (TMA), and can be prepared with the desired flow properties by the methods described in Hanson U.S. Pat. No. 4,136,085, which is hereby incorporated by reference.

The polymer can be blended with graphite, glass, PTFE, and titanium dioxide by the method described in Chen U.S. Pat. No. 4,224,214, which is hereby incorporated by reference.

The most preferred amide-imide polymer is reinforced with 30% by weight graphite fibers and has the following engineering properties:

TABLE I

| Property | Typical Value | Units | ASTM Test Method |
|---|---|---|---|
| Mechanical Properties | | | |
| Tensile Strength | | psi | D1708 |
| @ −321° F. | 22,800 | | |
| @ 73° F. | 29,400 | | |
| @ 275° F. | 22,800 | | |
| @ 450° F. | 15,700 | | |
| Tensile Elongation | | % | D1708 |
| @ −321° F. | 3 | | |
| @ 73° F. | 6 | | |
| @ 275° F. | 14 | | |
| @ 450° F. | 11 | | |
| Tensile Modulus | | psi | D1708 |
| @ 73° F. | 3,220,000 | | |
| Flexural Strength | | psi | D790 |
| @ −321° F. | 45,000 | | |
| @ 73° F. | 50,700 | | |
| @ 275° F. | 37,600 | | |
| @ 450° F. | 25,200 | | |
| Flexural Modulus | | psi | D790 |
| @ −321° F. | 3,570,000 | | |
| @ 73° F. | 2,880,000 | | |
| @ 275° F. | 2,720,000 | | |
| @ 450° F. | 2,280,000 | | |
| Compressive Strength | 32,700 | psi | D695 |
| Shear Strength | | psi | D732 |
| @ 73° F. | 17,300 | | |
| Izod Impact | | ft.-lbs./in. | D256 |
| @ 73° F. | 0.9 | | |
| Thermal Properties | | | |
| Deflection Temperature @ 264 psi | 540 | °F. | D648 |
| Coefficient of Linear Thermal Expansion | 5 × 10$^{-6}$ | in./in./°F. | D696 |
| Thermal Conductivity | 3.6 | btu-in. hr.-ft.$^2$-°F. | C177 |
| Flammability | 94V0 | Underwriters Laboratories | 94 |
| Limiting Oxygen Index | 52 | % | D2863 |
| General Properties | | | |
| Density | 1.42 | g/cc | D792 |
| Hardness "Rockwell" E | 94 | | |
| Water Absorption | 0.26 | % | D570 |

The preferred, glass reinforced, thermoplastic amide-imide resinous polymer comprises 30% by weight glass fibers and has the following properties:

TABLE II

| Property | Typical Value | Units | ASTM Test Method |
|---|---|---|---|
| Mechanical Properties | | | |
| Tensile Strength | | psi | D1708 |
| @ −321° F. | 29,500 | | |
| @ 73° F. | 29,700 | | |
| @ 275° F. | 23,100 | | |
| @ 450° F. | 16,300 | | |
| Tensile Elongation | | % | D1708 |
| @ −321° F. | 4 | | |
| @ 73° F. | 7 | | |
| @ 275° F. | 15 | | |
| @ 450° F. | 12 | | |
| Tensile Modulus | | psi | D1708 |

TABLE II-continued

| Property | Typical Value | Units | ASTM Test Method |
|---|---|---|---|
| @ 73° F. | 1,560,000 | | |
| Flexural Strength | | psi | D790 |
| @ −321° F. | 54,400 | | |
| @ 73° F. | 48,300 | | |
| @ 275° F. | 35,900 | | |
| @ 450° F. | 26,200 | | |
| Flexural Modulus | | psi | D790 |
| @ −321° F. | 2,040,000 | | |
| @ 73° F. | 1,700,000 | | |
| @ 275° F. | 1,550,000 | | |
| @ 450° F. | 1,430,000 | | |
| Compressive Strength | 34,800 | psi | D695 |
| Shear Strength | | psi | D732 |
| @ 73° F. | 20,100 | | |
| Izod Impact | | ft.-lbs./in. | D256 |
| @ 73° F. | 1.5 | | |
| Thermal Properties | | | |
| Deflection Temperature @ 264 psi | 539 | °F. | D648 |
| Coefficient of Linear Thermal Expansion | 9 × 10$^{-6}$ | in./in./°F. | D696 |
| Thermal Conductivity | 2.5 | btu-in. hr.-ft.$^2$-°F. | C177 |
| Flammability | 94V0 | Underwriters Laboratories | 94 |
| Limiting Oxygen Index | 51 | % | D2863 |
| Electrical Properties | | | |
| Dielectric Constant | | | D150 |
| @ 10$^3$Hz | 4.4 | | |
| @ 10$^6$Hz | 6.5 | | |
| Dissipation Factor | | | D150 |
| @ 10$^3$Hz | .022 | | |
| @ 10$^6$Hz | .023 | | |
| Volume Resistivity | 6 × 10$^{16}$ | ohms-in. | D257 |
| Surface Resistivity | 1 × 10$^{18}$ | ohms | D257 |
| Dielectric Strength | 835 | volts/mil. | |
| General Properties | | | |
| Density | 1.56 | g/cc | D792 |
| Hardness "Rockwell" E | 94 | | |
| Water Absorption | 0.24 | % | D570 |

The amide-imide polymers are prepared by reacting an aromatic polycarboxylic acid compound (acyl halide carboxylic acid and/or carboxylic acid esters) having at least three carboxylic acid groups such as trimellitic acid (TMA), 4-trimellitoyl anhydride halide (4-TMAC), pyromellitic anhydride, pyromellitic acid, 3,4,3',4' benzophenone tetracarboxylic acid or an anhydride thereof, or oxybis benzene dicarboxylic acid or an anhydride thereof.

The amide-imide polymers are preferably prepared by reacting an acyl halide derivative of an aromatic tricarboxylic acid anhydride with a mixture of largely- or wholly-aromatic primary diamines. The resulting products are polyamides wherein the linking groups are predominantly amide groups, although some may be imide groups, and wherein the structure contains free carboxylic acid groups which are capable of further reaction. Such polyamides are moderate molecular weight polymeric compounds having in their molecule units of:

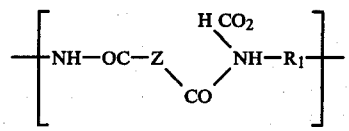

and units of:

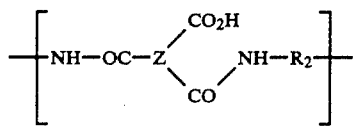

and, optionally, units of:

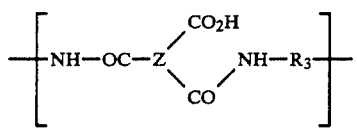

wherein the free carboxyl groups are ortho to one amide group, Z is an aromatic moiety containing 1 to 4 benzene rings or lower-alkyl-substituted benzene rings, $R_1$, $R_2$ and $R_3$ are different and are divalent wholly- or largely-aromatic hydrocarbon radicals. These hydrocarbon radicals may be a divalent aromatic hydrocarbon radical of from 6 to about 10 carbon atoms, or two divalent aromatic hydrocarbon radicals each of from 6 to about 10 carbon atoms joined directly or by stable linkages such as —O—, methylene —CO—, —SO$_2$—, —S—; for example, —R'—O—R'—, —R'—CH$_2$—R'—, —R'—CO—R'—, —R'—SO$_2$—R'— and —R'—S—R'—.

The polyamides are capable of substantially complete imidization by heating by which they form the polyamide-imide structure having to a substantial extent reoccurring units of:

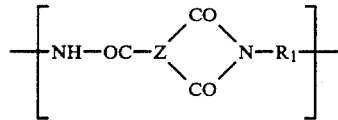

and units of:

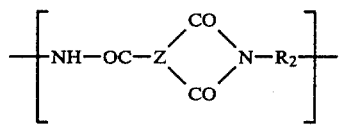

and, optionally, units of:

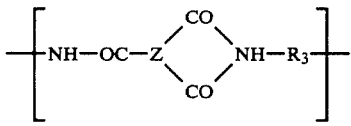

wherein one carbonyl group is meta to and one carbonyl group is para to each amide group and wherein Z, $R_1$, $R_2$ and $R_3$ are defined as above. Typical copolymers of this invention have up to about 50 percent imidization prior to heat treatment, typically about 10 to about 40 percent.

The polyamide-imide copolymers are prepared from an anhydride-containing substance and a mixture of wholly- or partially-aromatic primary diamines. Usefully the anhydride-containing substance is an acyl halide derivative of the anhydride of an aromatic tricarboxylic acid which contains 1 to 4 benzene rings or lower-alkyl-substituted benzene rings and wherein two of the carboxyl groups are ortho to one another. More preferably, the anhydride-containing substance is an acyl halide derivative of an acid anhydride having a single benzene or lower-alkyl-substituted benzene ring, and most preferably, the substance is the acyl chloride derivative of trimellitic acid anhydride (4-TMAC).

Usefully the mixture of diamines contains two or more, preferably two or three, wholly- or largely-aromatic primary diamines. More particularly, they are wholly- or largely-aromatic primary diamines containing from 6 to about 10 carbon atoms or wholly- or largely-aromatic primary diamines composed of two divalent aromatic moieties of from 6 to about 10 carbon atoms, each moiety containing one primary amine group, and the moieties linked directly or through, for example, a bridging —O—, —S—, —SO$_2$—, —CO—, methylene group. When three diamines are used they are preferably selected from the class composed of:

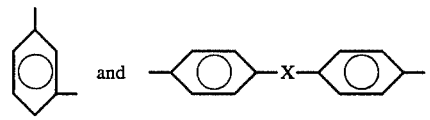

said X being an —O—, —CH$_2$—, or —SO$_2$— group. More preferably, the mixture of aromatic primary diamines is two-component and is composed of meta-phenylenediamine (MPDA) and p,p'-oxybis(aniline) (OBA), p,p'-methylenebis (aniline) (MBA), and p,p'-oxybis(aniline), p,p'-sulfonylbis(aniline) (SOBA), and p,p'-oxybis(aniline), p,p'-sulfonylbis(aniline) and meta-phenylenediamine, or p,p'-sulfonylbis (aniline) and p,p'-methylenebis(aniline). Most preferably, the mixture of primary aromatic diamines contains meta-phenylenediamine and p,p'-oxybis(aniline). The aromatic nature of the diamines provides the excellent thermal properties of the copolymers while the primary amine groups permit the desired imide rings and amide linkages to be formed.

When two diamines are used to achieve a polymer usefully combining the properties of both diamines, it is usual to stay within the range of about 10 mole % of the first diamine and 90 mole % of the second diamine to about 90 mole % of the first diamine and 10 mole % of the second diamine. Preferably the range is about a 20 to 80 mole ratio to about an 80 to 20 mole ratio. In the preferred embodiment wherein the acyl chloride of trimellitic acid anhydride is copolymerized with a mixture of p,p'-oxybis(aniline) and meta-phenylenediamine, the preferred range is from about 30 mole % of the former and about 70 mole % of the latter to about 70 mole % of the former and about 30 mole % of the latter.

Although embodiments of the invention have been shown and described, it is to be understood that various modifications and substitutions, as well as rearrangements of structural features and/or process steps, can be made by those skilled in the art without departing from the novel spirit and scope of this invention.

What is claimed is:
1. A composite piston, comprising:
a metal head having an annular wall defining a set of piston ring-receiving grooves, a transverse disc extending laterally between and connecting said annular wall for compressing an air fuel mixture, and a pair of legs extending longitudinally from said disc and spaced radially inwardly from said annular wall and defining a pair of diametrically opposed leg holes; and a thermoplastic, amide-imide resinous polymeric skirt having an elongated annular wall portion and a pair of bosses extending radially inwardly from said wall portion, said wall portion positioned in general longitudinal alignment with and cooperating with said annular wall of said head to define a composite piston wall for reciprocatingly sliding against a cylinder wall, said wall portion annularly surrounding said legs, said bosses connected to said legs and defining a pair of diametrically opposed skirt holes, and said skirt holes and said leg holes being transversely aligned in registration with each other and being of a sufficient size for pivotally receiving a wrist pin; and said amide-imide skirt and said metal head maintaining their structural relationship, shape and integrity at engine operating conditions.

2. A composite piston in accordance with claim 1 wherein said annular wall defines a plurality of oil apertures.

3. A composite piston in accordance with claim 1 wherein said amide-imide skirt has a pair of longitudinally spaced shoulders on opposite ends of each skirt hole, said shoulders each having a transverse ledge and cooperating with each other to define a generally rectangular transverse recess about each skirt hole.

4. A composite piston in accordance with claim 3 wherein at least one of said ledges defines oil retention grooves.

5. A composite piston in accordance with claim 1 wherein said amide-imide skirt defines retaining ring-receiving grooves about said skirt, holes and said wall portion of said amide-imide skirt is substantially longer than said annular wall of said metal head.

6. A composite piston in accordance with claim 1 wherein the maximum transverse span of said legs is slightly greater than the distance between said bosses, and said legs and said bosses are in press-fitting engagement with each other.

7. A composite piston in accordance with claim 1 including means for connecting said legs to said bosses.

8. A composite piston in accordance with claim 1 wherein said disc is substantially circular.

9. A composite piston in accordance with claim 1 wherein said disc is generally elliptical.

10. A composite piston in accordance with claim 1 wherein said disc defines a plurality of valve seats.

11. A composite poiston in accordance with claim 1 wherein said metal head consists essentially of aluminum and steel.

12. A composite engine part in accordance with claim 1 wherein said amide-imide skirt comprises a reaction product of a trifunctional carboxylic acid compound and at least one diprimary aromatic diamine.

13. A composite engine part in accordance with claim 12 wherein said amide-imide skirt comprises at least one of the following moieties:

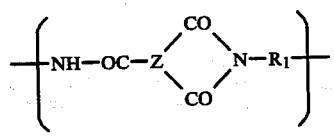

and

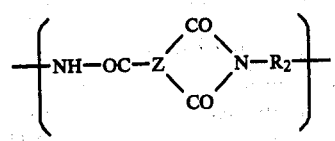

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S—radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

14. A composite engine part in accordance with claim 13 wherein $R_1$ is

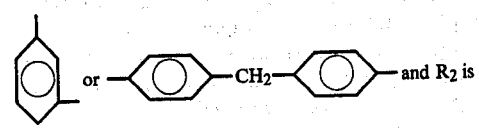 and $R_2$ is

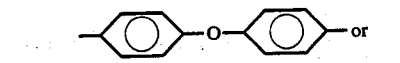 or

 or wherein $R_1$ is

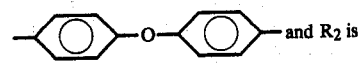 and $R_2$ is

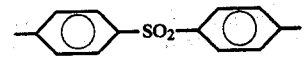

15. A composite engine part in accordance with claim 13 wherein Z is a trivalent benzene ring, $R_1$ is 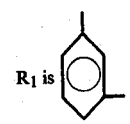

$R_2$ is 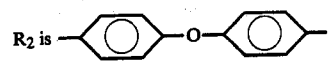

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

16. A composite engine part in accordance with claim 13 wnerein said amide-imide skirt comprises from 40% to 100% by weight amide-imide resinous polymer.

17. A composite engine part in accordance with claim 16 wherein said amide-imide skirt comprises from 65% to 75% by weight amide-imide resinous polymer.

18. A composite engine part in part in accordance with claim 13 wherein said amide-imide skirt comprises a fibrous reinforcing material selected from the group consisting essentially of graphite and glass.

19. A composite engine part in accordance with claim 18 wherein said amide-imide skirt comprises from 10% to 50% by weight graphite.

20. A composite engine part in accordance with claim 19 wherein said amide-imide skirt comprises from 30% to 34% by weight graphite.

21. A composite engine part in accordance with claim 18 wherein said amide-imide skirt comprises 10% to 60% by weight glass.

22. A composite engine part in accordance with claim 21 wherein said amide-imide skirt comprises 30% to 34% by weight glass.

23. A composite engine part in accordance with claim 18 wherein said fibrous reinforcing material has a polymeric sizing that substantially maintains its structural integrity at engine operating conditions.

24. A composite engine part in accordance with claim 18 wherein said amide-imide skirt comprises not greater than 3% by weight polytetrafluoroethylene.

25. A composite engine part in accordance with claim 24 wherein said amide-imide skirt comprises from ½% to 1% by weight polytetrafluoroethylene.

26. A composite engine part in accordance with claim 18 wherein said amide-imide skirt comprises not more than 6% by weight titanium dioxide.

27. A process for forming a composite piston, comprising the steps of:
injection molding a thermoplastic, amide-imide resinous polymer to form an amide-imide skirt having a pair of inwardly extending bosses defining a pair of skirt holes;
allowing said amide-imide resinous polymeric skirt to cool below its plastic deformation temperature;
post curing said amide-imide skirt by solid state polymerization to enhance the strength and integrity of said amide-imide skirt;
turning a metal head on a lathe to form an annular wall defining a set of piston ring-receiving grooves and a substantially circular disc extending across said annular wall, cutting a pair of metal legs extending axially from said disc on a milling machine, and drilling a pair of aligned holes in said metal legs;
connecting said amide-imide skirt to said head by press fitting said bosses against said metal legs until said amide-imide skirt abuts against said annular wall said amide-imide skirt abuts against said annular wall of said metal head; and
honing said holes in said amide-imide skirt and said metal legs to a sufficient size to pivotally receive a wrist pin.

28. A process in accordance with claim 27 including drilling a set of oil holes in said annular wall.

29. A process in accordance with claim 27 wherein said metal head consists essentially of aluminum and steel.

30. A process in accordance with claim 27 wherein said amide-imide polymer is prepared by reacting a trifunctional carboxylic acid compound with at least one diprimary aromatic diamine.

31. A process in accordance with claim 30 wherein said amide-imide polymer comprises one of the following moieties:

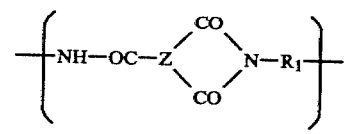

and

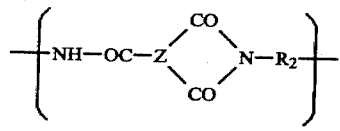

wherein one carbonyl group is meta to and one carbonyl group is para to each amide group and wherein Z is a trivalent benzene ring or lower-alkyl-substituted trivalent benzene ring, $R_1$ and $R_2$ are different and are divalent aromatic hydrocarbon radicals of from 6 to about 10 carbon atoms or two divalent aromatic hydrocarbon radicals of from 6 to about 10 carbon atoms joined directly or by stable linkages selected from the group consisting of —O—, methylene, —CO—, —SO$_2$—, and —S— radicals and wherein said $R_1$ and $R_2$ containing units run from about 10 mole percent $R_1$ containing unit and about 90 mole percent $R_2$ containing unit to about 90 mole percent $R_1$ containing unit and about 10 mole percent $R_2$ containing unit.

32. A process in accordance with claim 31 wherein $R_1$ is

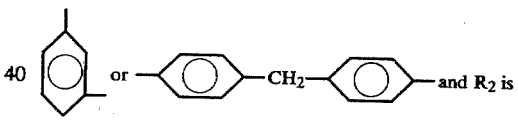

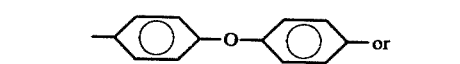

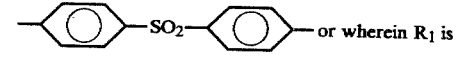

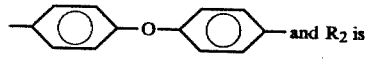

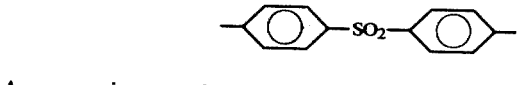

33. A process in accordance with claim 31 wherein Z is a trivalent benzene ring,

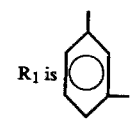

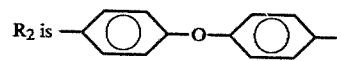

and wherein the concentration range runs from about 30 mole percent of the $R_1$ containing units and about 70 mole percent of the $R_2$ containing units to about 70 mole percent of the $R_1$ containing units and about 30 mole percent of the $R_2$ containing units.

34. A process in accordance with claim 31 wherein said polymer comprises from 10% to 50% by weight graphite fibers.

35. A process in accordance with claim 34 wherein said polymer comprises from 30% to 34% by weight graphite fibers.

36. A process in accordance with claim 31 wherein said polymer comprises from 10% to 60% by weight glass fibers.

37. A process in accordance with claim 36 wherein said polymer comprises from 30% to 34% by weight glass fibers.

38. A process in accordance with claim 27 wherein said injection molding includes partially opening a mold having a generally skirt-shaped cavity, placing a dam adjacent the partially opened portion of said mold, injecting said polymer at its melt temperature into said cavity until said cavity is substantially filled with said polymer, substantially preventing said polymer from flowing out of said partially opened portion of said mold with said dam, and closing said mold while said polymer is above its plastic deformation temperature to compress said polymer; and said cooling includes cooling said polymer in said closed mold below its plastic deformation temperature to solidify the shape of the molded skirt.

39. A process in accordance with claim 38 wherein said mold is closed by clamping.

40. A process in accordance with claim 39 wherein said dam is removed before said clamping.

* * * * *

UNITED STATES PATENT OFFICE
CERTIFICATE OF CORRECTION

Patent No. 4,440,069    Dated April 3, 1984

Inventor(s) Matthew W. Holtzberg, Steven J. Henke, Lawrence D. Spaulding

It is certified that error appears in the above-identified patent and that said Letters Patent are hereby corrected as shown below:

| Patent Column | Line | |
|---|---|---|
| 11 | 26 | reads "methylene" and should read "methylene," |
| 12 | 18 & 19 | after "-CO-," add --or-- |
| 13 | 52 | reads "poiston" and should read --piston-- |
| 15 | 4 | delete "in part" |
| 15 | 55 | delete entire line |
| 15 | 56 | delete "lar" |

Signed and Sealed this

Twenty-second Day of October 1985

[SEAL]

Attest:

Attesting Officer

DONALD J. QUIGG

Commissioner of Patents and Trademarks—Designate